US008836811B2

(12) United States Patent
Jape et al.

(10) Patent No.: US 8,836,811 B2
(45) Date of Patent: Sep. 16, 2014

(54) CONTENT STORAGE MANAGEMENT IN CAMERAS

(71) Applicant: International Business Machines Corporation, Armonk, NY (US)

(72) Inventors: Suyash S. Jape, Pune (IN); John Gerard Musial, Newburgh, NY (US); Abhinay Ravinder Nagpal, Pune (IN); Sandeep Ramesh Patil, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/741,130

(22) Filed: Jan. 14, 2013

(65) Prior Publication Data

US 2013/0120612 A1    May 16, 2013

Related U.S. Application Data

(63) Continuation of application No. 13/023,297, filed on Feb. 8, 2011, now Pat. No. 8,610,788.

(51) Int. Cl.
*H04N 5/228* (2006.01)
*H04N 5/77* (2006.01)
*H04N 9/82* (2006.01)
*H04N 21/418* (2011.01)
*H04N 21/84* (2011.01)
*H04N 21/44* (2011.01)
*H04N 21/433* (2011.01)
*H04N 21/4223* (2011.01)

(52) U.S. Cl.
CPC ............ *H04N 5/772* (2013.01); *H04N 21/4184* (2013.01); *H04N 21/84* (2013.01); *H04N 9/8233* (2013.01); *H04N 21/44008* (2013.01); *H04N 21/4334* (2013.01); *H04N 21/4223* (2013.01); *H04N 9/8205* (2013.01)
USPC .................. 348/222.1; 348/231.1; 348/231.2; 348/231.3

(58) Field of Classification Search
USPC .................. 348/231.1–231.9, 222.1; 382/190
See application file for complete search history.

(56) References Cited

U.S. PATENT DOCUMENTS 6,721,451 B1    4/2004  Ishitani
7,343,365 B2    3/2008  Farnham et al.
(Continued)

OTHER PUBLICATIONS

Notification of Transmittal of the International Search Report and the Written Opinion of the International Searching Authority, or the Declaration, PCT Application No. PCT/US2012/24297, dated May 23, 2012.

*Primary Examiner* — Yogesh Aggarwal
(74) *Attorney, Agent, or Firm* — Cahn & Samuels, LLP

(57) ABSTRACT

An embodiment of the invention includes a method for managing media files created by a digital camera. More specifically, a content analyzing module tags a media file with one or more location media tags, event media tags, and/or content media tags. The location media tags are indicative of the geographic location where the media file was created. The event media tags are indicative of an event where the media file was created; and, the content media tags are indicative of individual(s) in the media file. A priority analyzing module connected to the content analyzing module determines a priority of the media file based on priority rules and the location media tags, event media tags, and/or the content media tags. A storage management module connected to the priority analyzing module stores the media file based on the determined priority.

23 Claims, 4 Drawing Sheets

(56) References Cited

U.S. PATENT DOCUMENTS

| | | |
|---|---|---|
| 7,693,817 B2 | 4/2010 | Dumais et al. |
| 7,702,821 B2 | 4/2010 | Feinberg et al. |
| 2003/0222889 A1* | 12/2003 | Parulski et al. ............... 345/619 |
| 2006/0017950 A1* | 1/2006 | Ikegami et al. ............. 358/1.13 |
| 2006/0074961 A1* | 4/2006 | Kongalath et al. ............ 707/102 |
| 2009/0136211 A1 | 5/2009 | Kikukawa et al. |
| 2009/0190803 A1 | 7/2009 | Neghina et al. |
| 2009/0195392 A1 | 8/2009 | Zalewski |
| 2009/0265165 A1 | 10/2009 | Apelqvist et al. |
| 2010/0029326 A1 | 2/2010 | Bergstrom et al. |
| 2010/0033371 A1 | 2/2010 | Kumagai et al. |
| 2010/0080536 A1 | 4/2010 | Marumori |
| 2010/0082684 A1 | 4/2010 | Churchill et al. |
| 2010/0097494 A1 | 4/2010 | Gum et al. |
| 2011/0032378 A1* | 2/2011 | Kaneda ...................... 348/222.1 |
| 2012/0023099 A1* | 1/2012 | Crossley et al. .............. 707/736 |

* cited by examiner

CONTENT STORAGE MANAGEMENT IN CAMERAS

This patent application is a continuation application of U.S. patent application Ser. No. 13/023,297 filed on Feb. 8, 2011, which is hereby incorporated by reference.

BACKGROUND

The present invention is in the field of systems, methods and computer program products for content storage management in cameras.

In the video and still camera market, recording media has shifted from tape to disc, and from disc to smart media cards (e.g., secure digital (SD) cards). Other recording media include micro drives, compact flash, digital video disc (DVD), portable high definition display (HDD), and Blu-ray Disc™. For instance, video cameras are available that employ a combination of HDD and Blu-ray Disc™ to facilitate data transfer.

The quality of digital recordings is subject to several factors, such as compression ratios, images stored per second, image size, and the duration of image retention before images are overwritten. Different manufacturers of digital video recorders use different compression standards and varying compression ratios. Video cameras offer various compression decompression algorithms (codecs) to optimize storage on the camera.

SUMMARY OF THE INVENTION

An embodiment of the invention includes a method for managing media files created by a digital camera. More specifically, a content analyzing module tags a media file with one or more location media tags, event media tags, and/or content media tags. The location media tags are indicative of the geographic location where the media file was created. The event media tags are indicative of an event where the media file was created; and, the content media tags are indicative of individual(s) in the media file.

A priority analyzing module connected to the content analyzing module determines a priority of the media file based on priority rules and the location media tags, event media tags, and/or the content media tags. A storage management module connected to the priority analyzing module stores the media file based on the determined priority. Higher priority media files are stored on a first storage device and/or lower priority media files are stored on a second storage device. Data retrieval from the first storage device is faster than data retrieval from the second storage device.

BRIEF DESCRIPTION OF THE SEVERAL VIEWS OF THE DRAWINGS

The present invention is described with reference to the accompanying drawings. In the drawings, like reference numbers indicate identical or functionally similar elements.

DETAILED DESCRIPTION

Figure 1:
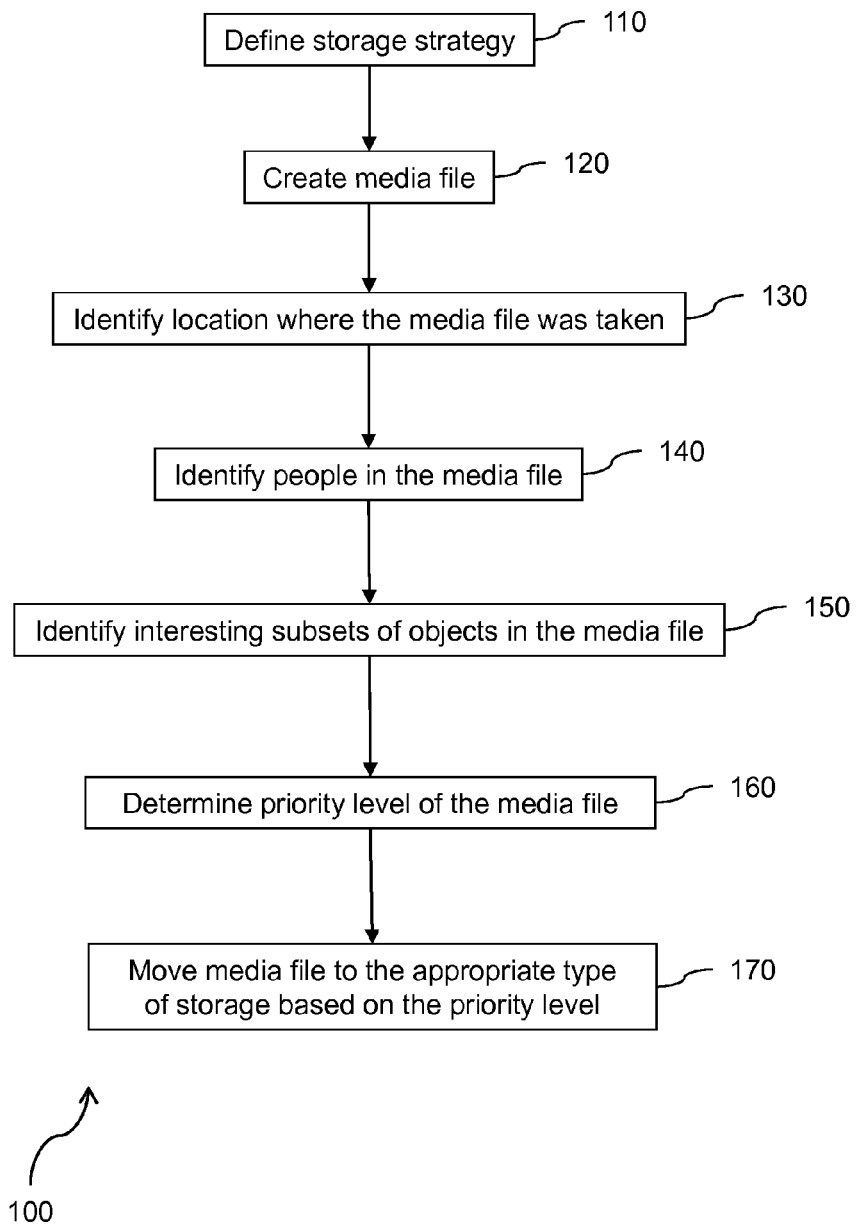
FIG. 1 is a flow diagram illustrating a method for storage content management according to an embodiment of the invention.

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

An embodiment of the invention analyzes the media stored in a camera (images and/or videos) on the basis of a user's social network (e.g., to determine number of strangers), geographic location (e.g., geo-tagging), and/or the user's calendar (e.g., to determine relevant content which may be accessed in upcoming events), and facilitates intelligent placement of media files on different types of storage devices within the camera. Based on the placement of the media files, the appropriate compression is selected on attached hybrid media storage drives.

For example, in at least one embodiment, a global positioning system (GPS) and internet enabled camera includes multiple storage devices with combinations of microdrives, compact flash cards, DVD, HDD, SD cards, and Blu-ray Discs™. The content that is most likely to be useful is placed on the storage type which has faster retrieval time; which however, is typically more expensive (e.g., compact flash cards). The content which is of lower priority is placed on a slower and often cheaper storage type (e.g., microdrive).

The usefulness/priority of the content is determined based on multiple factors, including geo-tagging, social presence of the content, and/or classification of the social presence by the user. For instance, if a video is shot away from a known source of power, it is likely that the power source is not near-by. Thus, the video is stored to a memory device which takes up less battery power.

In at least one embodiment of the invention, the possible media to be recorded or placed in high end storage devices is intelligently and automatically identified during the shooting/recording time itself—by smartly integrating information from the user's social media presence (e.g., places and persons). For instance, if a video includes family members, it is likely that the video is shot to preserve memories of that time. Thus, the video is transferred to Blu-Ray Disc™ for high definition archival. If the video contains social contacts which are not direct connections, the video is given lower priority.

A set of rules (predetermined or dynamic) define where videos of different priority are stored or archived to. For example, rules are defined such that low priority videos are moved to the micro drive when it is attached to the camera. Videos which contain social contacts which are not directly related to the user or places which are not in a "Favorites" list are moved to the micro drive, as it is an often cheaper and less reliable storage type. In at least one embodiment, recognition of the persons in the video or photograph is done through facial recognition, and social information and connections are fetched from a configured social network source.

Another example analyzes media content from closed-circuit television (CCTV) storage. If people passing by are recognized and they are of a trusted social and/or professional network, the media content is moved to a higher compression and slower storage device (e.g., micro drives/hard drives). Strangers whose videos may need to be scrutinized are stored on faster storage in an uncompressed format.

At least one embodiment of the invention identifies places the user likes using automatic metadata tagging of the content, such as analyzing audio content for laughter and/or analyzing videos/images for smiles. Based on the emotional content of the media file, the media file is classified as higher or lower priority. In at least one embodiment, the classification of content also determines compression ratios that it is stored at. Thus, higher priority content (e.g., content which is located at geo-locations that the user likes) are stored on more reliable storage (e.g., compact flash cards).

An embodiment of the invention defines a set of rules which provision social network driven rating and back up strategies for content. The highest priority content is replicated on multiple types of storage. For example, a professional cameraman shooting a sports game classifies players as "More Valuable" in his/her professional network. When images or video of "More Valuable" players are captured, the media file(s) are saved to multiple storage devices. In another example, a wildlife cameraman tags rare animals in his/her professional network as "More Valuable" (e.g., tigers, bears). When a "More Valuable" animal is recognized, the media file(s) are replicated across multiple storage devices.

In addition, at least one embodiment analyzes upcoming events in the user's calendar (e.g., a family member's birthday) and automatically arranges the media files such that relevant photos (e.g., past birthday photos) can be accessed faster. Thus, media files can be searched based on location and people in the media file; and, relevant media files can be accessed faster. If a particular video or photo has more strangers and/or was shot at a location disliked by the user (e.g., as determined by negative tags assigned by the user), then such media files are compressed more and saved to slower and cheaper storage devices as compared to other media files shot at "liked" locations.

FIG. 1 is a flow diagram illustrating a method 100 for storage content management according to an embodiment of the invention. Data with high read affinity is identified and placed/replaced to an appropriate storage device. The storage strategy is defined with input from the camera user to map levels of content priority with the type of storage device to be used from the available storage devices in the camera 110. The camera is scanned for the currently attached storage types; and, each level of priority is mapped to the corresponding storage device type. Finer strategy details are defined, such as the type of content to be replicated (e.g., if sports player John Doe is identified in a media file, then generate a back-up copy).

A media file is created when a photograph or video is captured 120; and, the location where the media file was taken is identified 130 (e.g., automatically via GPS and/or manual input by the user). People within the media file are also identified 140 (e.g., automatically using facial recognition systems and/or manual input by the user). Interesting subsets of objects are identified in the media file 150. For example, people who are within the user's social network and/or places the user has visited in the past are identified from analyzing metadata of media files stored on the camera. In another example, the media file is examined for laughter and/or smiles. The priority level of the media file is determined using the above parameters, including the storage strategy 160; and, the media file is moved to the appropriate type of storage based on the priority level 170. The following provides a high-level pseudo-code for performing the method 100:

Pseudo_DataAnalyse ( )
{
Start
Content (C1....Cn) = Parse the content through analysis techniques :
    Facial , audio , geo recognition Dataset1=Analyse_social_network( );
Dataset2=Photos_from_places_user_liked;
Dataset3=Filter (Dataset1) //find photos with less number of strangers in it;
Dataset4= Fetch the defined strategy for the content analyzed ( C1....Cn)
RebalanceStorage ( );
}

Figure 2:
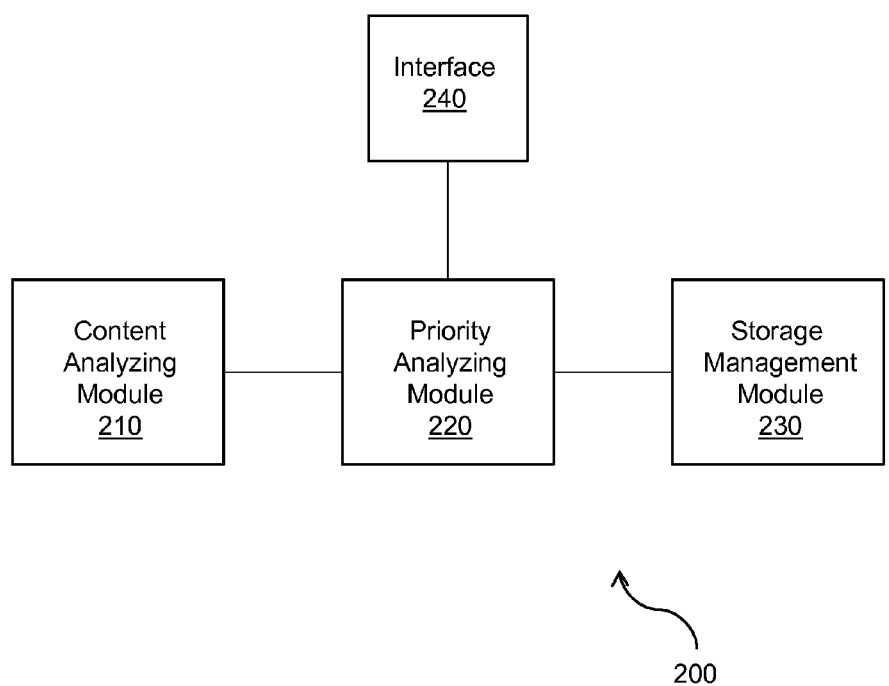
FIG. 2 illustrates a system for managing media files according to an embodiment of the invention
Figure 3:
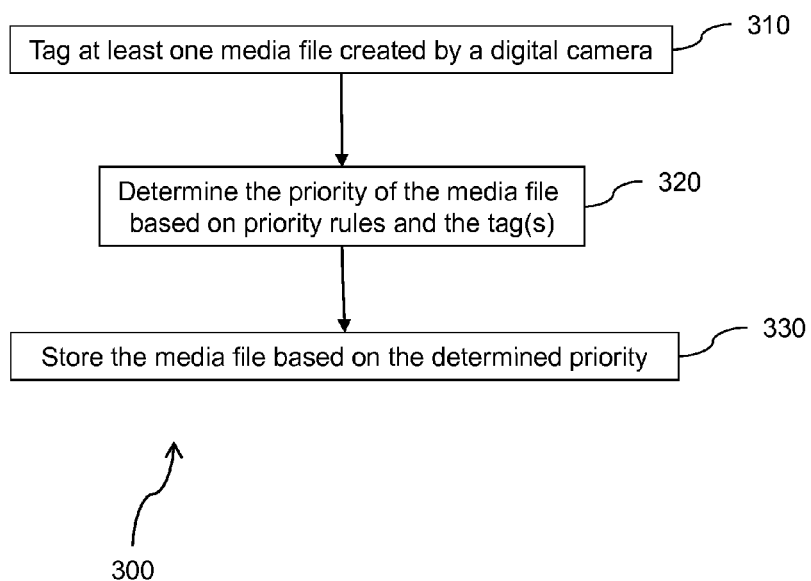
FIG. 3 is a flow diagram illustrating a method for managing media files according to another embodiment of the invention.

FIG. 2 illustrates a system 200 for managing media files (e.g., jpeg, mjpg, wmv) according to an embodiment of the invention, wherein the system 200 includes a content analyzing module 210, a priority analyzing module 220, and a storage management module 230. FIG. 3 is a flow diagram illustrating a method 300 for managing media files according to an embodiment of the invention, for example, using the system 200. The content analyzing module 210 tags at least one media file 310, wherein the media file is created by a digital camera or a device including a digital camera (e.g., cell phone, webcam, tablet computer). The content analyzing module 210 tags the media file with one or more location media tags, event media tags, and/or content media tags.

As described below, location media tags indicate the geographic location where the media file was created (e.g., GPS coordinates, city, state, zip code, and/or area code). Furthermore, the event media tags indicate an event where the media file was created (e.g., conference, meeting, party, sporting event); and, the content media tags indicate one or more individuals (human and/or animal) in the media file. Thus, for example, a photograph of John Doe and Jane Doe includes the following tags: Washington, D.C.; 20008; ABC Conference Center; XYZ Annual Meeting; Jane Doe; and, John Doe. The content analyzing module 210 automatically tags the media files (e.g., via GPS, facial recognition) and/or tags the media files based on user input (e.g., via a touch screen interface). In at least one embodiment, the system 200 further includes an interface 240 (e.g., touch screen, flag button, up/down/left/right arrow keys) connected to the content analyzing module 210 and/or the priority analyzing module 220 for receiving user input.

The priority analyzing module 220 determines the priority of the media file based on priority rules and the location media tag, the event media tag, and/or the content media tag 320. In at least one embodiment, the priority rules are set and/or modified based on input from the user of the digital camera, such as user ratings of individual media files (e.g., numeric rating system, alphabetic rating system) and/or user flags on individual media files. Thus, for example, the priority rules assign a higher priority to a video having a 5-star user rating, and a lower priority to a video having a 3-star user rating.

In another embodiment, the priority rules are based on ratings that the user has assigned to specific media tags. For example, the user assigns a high rating to "Miami" location media tags and a low rating to "Chicago" location media tags. In another example, the user assigns a high rating to "John Doe" content media tags and a low rating to "John Smith" content media tags.

In at least one embodiment of the invention, the priority rules use a scoring/point system to determine the priority of media files having different types of media tags (e.g., location, event, or content) and/or media files having more than one tag. For example, the user assigns the following scores to different tags:

| Tag | Tag Type | Score |
| --- | --- | --- |
| Miami | location | 5 |
| Chicago | location | 1 |
| John Doe | content | 3 |
| John Smith | content | 1 |

Thus, priority rules evaluating total score values assigns a photograph having "Miami" and "John Smith" tags (total tag value of 6) a higher priority than a photograph having "Chicago" and "John Doe" tags (total tag value of 4). Another embodiment having priority rules that evaluate average scores assigns a photograph having only a "Miami" tag (average tag value of 5, total tag value of 5) a higher priority than a photograph having "Chicago", "John Doe", and "John Smith" tags (average tag value of 1.7, total tag value of 5).

Another embodiment of the invention includes priority rules that utilize coefficients as weighing factors for different media tag types, i.e., location, event or content. For example, the user assigns a high rating to location media tags (coefficient=3), a medium rating to event media tags (coefficient=2), and a low rating to content media tags (coefficient=1). Thus, in the above example, a photograph having a "Chicago" tag (3×1=3) has the same priority as a photograph having a "John Doe" tag (1×3=3). As described more fully below, the two photographs will be stored on the same storage device.

Furthermore, priority rules evaluating total weighted scores assigns a higher priority to a photograph having "Miami" and "John Smith" tags ((3×5)+(1×1)=16) than a photograph having "Chicago" and "John Doe" tags ((3×1)+ (1×3)=6). Another embodiment using priority rules that evaluate average weighted scores assigns a higher priority to a photograph having a "Miami" tag (average weighted score=15) than a photograph having "Chicago", "John Doe", and "John Smith" tags (average weighted score=2.3).

In yet another embodiment, the priority analyzing module 220 analyzes the media files to identify media tag(s) having a higher occurrence in the media files, and media tag(s) having a lower occurrence in the media files. Based on the analysis of the occurrence of media tags, the priority rules are automatically set by the priority analyzing module 220 (i.e., without direct manual user input). Thus, for example, the analyzing module 220 identifies that the media files include a threshold number of photographs and/or videos that have a "Florida" location media tag (e.g., 50 occurrences); and as such, the analyzing module 220 assigns a 4 (out of 5) priority score to the photographs.

Thus, at least one embodiment of the invention uses 3 factors for determining priority: flags/user ratings on individual media files, priority/scores of media tags, and occurrence of media tags. At least one embodiment of the invention includes priority rules that assign different ranks to the factors, e.g., user flags are highest priority and occurrence of media tags is a low priority. Another embodiment uses a numerical scoring system to weight the different factors. For example, user flags are assigned a score of 10; media tags reaching a first threshold occurrence (e.g., 50) are assigned a score of 10; and, media tags reaching a second threshold occurrence (e.g., 100) are assigned a score of 15. Thus, if photograph A is flagged by the user; photograph B has an event media tag that has an occurrence of 67 in the media files; and photograph C has a location media tag that has an occurrence of 104 in the media files; then photograph C has the highest priority and photographs A and B have equal priority. Another embodiment includes negative user flags, which are assigned a score of −10.

In another example, user ratings of individual media files are assigned a score of 5 per star, or 5 for a "Low" rating, 10 for a "Medium" rating, and 15 for a "High" rating. Thus, a video having a 3 star rating (score=15) has a higher priority than a photograph having 4 media tags having a total tag value of 12. If the priority rules evaluate average tag scores, then a photograph having 2 media tags having an average tag value of 6 has a higher priority than a video having a "Low" rating (score=5). The various scores and weighing factors are defined in the priority rules by the user and/or the manufacturer of the system 200.

In addition, at least one embodiment of the invention identifies at least one person in the media file, for example, via user input and/or a facial recognition component of the content analyzing module 210. A network component (e.g., web enabled communication module for searching the user's FACEBOOK.COM profile or other social networking site) of the priority analyzing module 220 searches a network system of the user to determine whether the identified person is in the user's network. The network system is stored on the digital camera, linked to the digital camera (e.g., USB cable to external storage, wireless link to a smart phone), and/or the digital camera is web-enabled. As used herein, the term "network" includes one or more social networks (e.g., FACEBOOK. COM, MYSPACE.COM, e-mail contacts list, user-generated Friends List) and/or professional networks (e.g., employee directory, e-mail contacts list, LINKEDIN.COM). The priority of the media file is determined based on whether the identified person is in the user's network (e.g., network contacts are assigned a score of 10, an indirect network contact (i.e., a contact of a contact) is assigned a score of 5).

In one embodiment, the content analyzing module 210 identifies at least three people in the media file via facial recognition, and searches the user's network system to determine whether the identified people are in the user's network. The priority analyzing module 220 determines whether there are more people in the media file in the user's network than people in the media file not in the user's network. The priority of the media file is determined based on whether there are more people in the media file in the user's network than people in the media file not in the user's network.

Furthermore, in at least one embodiment of the invention, the content analyzing module 210 includes an emotion component for analyzing the media file to identify the presence of smiles, frowns, laughter, and/or crying. The priority analyzing module 220 determines the priority of the media file based on the analyzing. Specifically, media files having smiles and/or laughter are assigned higher priorities than media files having frowns and/or crying.

In addition, in at least one embodiment of the invention, the content analyzing module 210 and/or the priority analyzing module 220 includes a calendar component for accessing a calendar of the user and identifying an upcoming event on the calendar. The user's calendar is stored on the digital camera, linked to the digital camera (e.g., USB cable to external storage, wireless link to a personal digital assistant (PDA)), and/or the digital camera is web-enabled. An event component of the priority analyzing module 220 determines whether the media file has an event tag related to the upcoming event. If the media file has an event tag related to the upcoming event, then a higher priority is assigned to the media file. Thus, for example, if a user's calendar indicates that the user will be traveling to California to watch a sporting event next week, then media files with "California" location media tags and/or "Sports" event media tags are assigned a higher priority.

The user's calendar is accessed (and thus, priorities updated) at predetermined intervals (e.g., every Monday) as defined by the manufacturer of the system 200 and/or the user. For example, media file Z is a photograph of Jane Doe, currently having a "Medium" priority. The priority analyzing module 220 identifies that Jane Doe's birthday is next week; and, the priority of media file Z is updated to "High". After Jane Doe's birthday has passed, the priority of media file Z is returned to "Medium".

The storage management module 230 stores the media file based on the determined priority 330. In at least one embodiment, the digital camera includes a combination of built-in storage devices (e.g., hard drive) and/or removable storage devices (e.g., memory card). The media files are stored in the digital camera and/or on an external storage device. In at least one embodiment, the digital camera includes a designated storage area for storing the priority rules, wherein the media files are stored in a different storage area. In another embodiment, the area where the priority rules are stored also includes storage for media files.

In at least one embodiment, higher priority media files are stored on a first storage device (e.g., compact flash card); and, lower priority media files are stored on a second storage device (e.g., microdrive). Data retrieval from the first storage device is faster than data retrieval from the second storage device. In at least one embodiment, the second storage device is external to the digital camera. Moreover, medium priority media files are stored on a third storage device, wherein data retrieval from the third storage device is faster than data retrieval from the second storage device and slower than data retrieval from the first storage device.

In another embodiment, the storage management module 230 automatically transfers one or more lower priority media files to an external storage device upon connection of the digital camera to the external storage device. In yet another embodiment, the storage management module 230 automatically stores a backup copy of a higher priority media file on a storage device that is different than the storage device that the higher priority media file is stored on. As the priorities of media files change and are updated (e.g., media file A has a "Chicago" location media tag; the priority of media file A increases as more media files are created having a "Chicago" location media tag), the storage management module 230 moves/rearranges the media files. Moreover, backup media files that were created in response to an upcoming event are deleted after the event has occurred. In at least one embodiment of the invention, the media file is stored in a cloud computing environment. Specifically, different media files are stored in different network locations based on the determined priority.

At least one embodiment of the invention registers at least one individual as the user of the digital camera. When a new media file is created in response to input by an operator of the digital camera (e.g., button pressed, autotimer set), the operator of the digital camera is identified. The operator is identified using a biometric sensor (e.g., fingerprint scanner, voice recognition) and/or when the operator unlocks and/or logs on to the digital camera. The priority analyzing module 220 assigns a higher priority to the new media file if the operator of the digital camera is the user, and assigns a lower priority to the new media file if the operator of the digital camera is not the user. Another embodiment assigns a different priority to the media file based on the registered user. For instance, John Doe and Jane Doe are both registered users; however, a higher priority is assigned to media files created by John Doe and a lower priority is assigned to media files created by Jane Doe, or vice versa.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute with the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
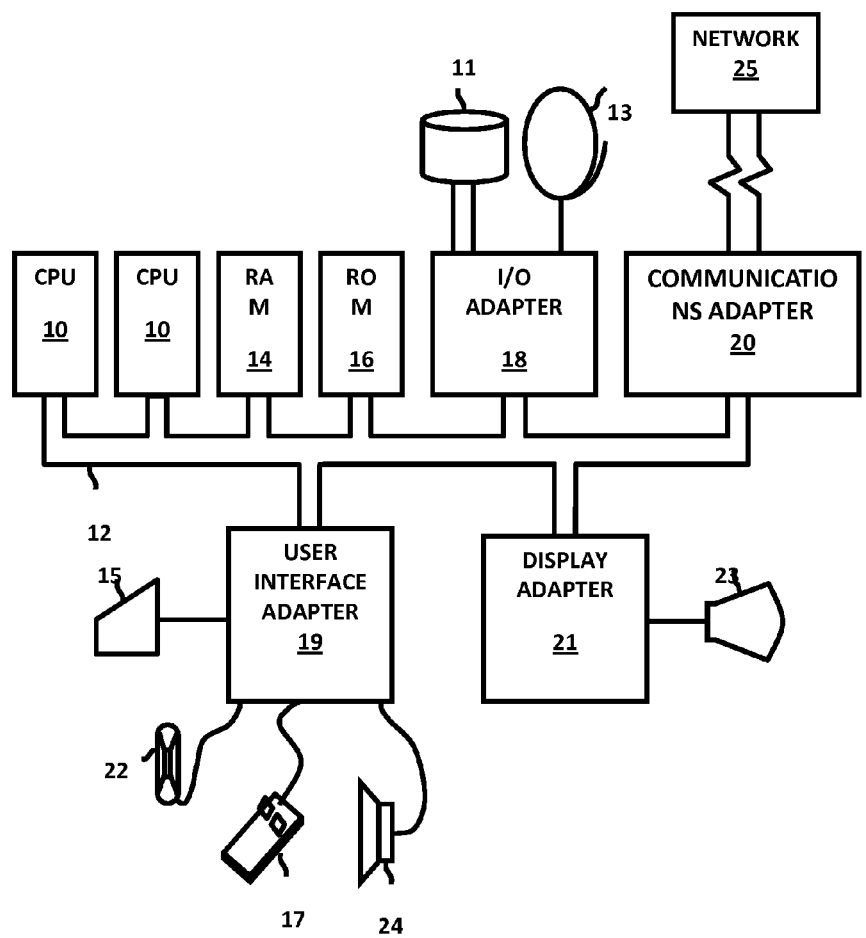
FIG. 4 illustrates a computer program product according to an embodiment of the invention.

Referring now to FIG. 4, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 10. The CPUs 10 are interconnected with system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system for managing media files on a digital camera, said system including:
   a content analyzing module for tagging at least one media file on said digital camera with:
      at least one location media tag indicative of the geographic location where the media file was created,
      at least one event media tag indicative of an event where the media file was created, and
      at least one content media tag indicative of an individual in the media file;
   a priority analyzing module connected to the content analyzing module, said priority analyzing module determines a priority of the media file based on priority rules and the location media tag, the event media tag, and the content media tag; and
   a storage management module connected to said priority analyzing module, said storage management module stores the media file in said digital camera based on the priority determined by said priority analyzing module.

2. The system according to claim 1, further including:
   a first storage device connected to said priority analyzing module for storing at least one higher priority media file, said first storage device having a first data retrieval time for retrieving the higher priority media file; and
   a second storage device connected to said priority analyzing module for storing at least one lower priority media file, said second storage device having a second data retrieval time for retrieving the lower priority media file, wherein the first data retrieval time is faster than the second data retrieval time.

3. The system according to claim 1, further including an interface connected to said priority analyzing module, said interface receives input from a user of said digital camera for setting the priority rules, the input including at least one of:
- at least one higher priority location media tag;
- at least one lower priority location media tag;
- at least one higher priority event media tag;
- at least one lower priority event media tag;
- at least one higher priority content media tag;
- at least one lower priority content media tag;
- at least one media file flagged by the user; and
- at least one media file rated by the user.

4. The system according to claim 1, further including:
- a facial recognition component of said content analyzing module for identifying at least one person in the media file; and
- a network component of said priority analyzing module for searching a network system of the user to determine whether the identified person is in the user's network,
- wherein said priority analyzing module determines the priority of the media file based on whether the identified person is in the user's network.

5. The system according to claim 1, further including:
- a calendar component of said content analyzing module for identifying an upcoming event on a calendar of the user;
- an event component of said priority analyzing module for determining whether the media file has an event tag related to the upcoming event; and
- wherein said priority analyzing module assigns a higher priority to the media file if the media file has the event tag related to the upcoming event.

6. The system according to claim 1, further including an emotion component of said content analyzing module for analyzing at least one media file on said digital camera to identify at least one of smiles, frowns, laughter, and crying, wherein said priority analyzing module determines the priority of the media file based on said analyzing.

7. A system for managing media files on a digital camera, said system including:
- a content analyzing module for tagging at least one media file on said digital camera with:
  - at least one location media tag indicative of the geographic location where the media file was created,
  - at least one event media tag indicative of an event where the media file was created, and
  - at least one content media tag indicative of an individual in the media file;
- a priority analyzing module connected to the content analyzing module, said priority analyzing module determines a priority of the media file based on priority rules and the location media tag, the event media tag, and the content media tag;
- a storage management module connected to said priority analyzing module, said storage management module stores the media file in said digital camera based on the priority determined by said priority analyzing module;
- a first storage device connected to said priority analyzing module for storing at least one higher priority media file, said first storage device having a first data retrieval time for retrieving the higher priority media file;
- a second storage device connected to said priority analyzing module for storing at least one lower priority media file, said second storage device having a second data retrieval time for retrieving the lower priority media file, the first data retrieval time being faster than the second data retrieval time;
- a calendar component of said content analyzing module for identifying an upcoming event on a calendar of the user; and
- an event component of said priority analyzing module for determining whether the media file has an event tag related to the upcoming event, said priority analyzing module assigns a higher priority to the media file when the media file has the event tag related to the upcoming event.

8. The system according to claim 7, further including an interface connected to said priority analyzing module, said interface receives input from a user of said digital camera for setting the priority rules, the input including at least one of:
- at least one higher priority location media tag;
- at least one lower priority location media tag;
- at least one higher priority event media tag;
- at least one lower priority event media tag;
- at least one higher priority content media tag;
- at least one lower priority content media tag;
- at least one media file flagged by the user; and
- at least one media file rated by the user.

9. The system according to claim 7, further including:
- a facial recognition component of said content analyzing module for identifying at least one person in the media file; and
- a network component of said priority analyzing module for searching a network system of the user to determine whether the identified person is in the user's network,
- wherein said priority analyzing module determines the priority of the media file based on whether the identified person is in the user's network.

10. A system for managing media files on a digital camera, said system including:
- a content analyzing module for tagging at least one media file on said digital camera with at least two of:
  - at least one location media tag indicative of the geographic location where the media file was created,
  - at least one event media tag indicative of an event where the media file was created, and
  - at least one content media tag indicative of an individual in the media file;
- a priority analyzing module connected to the content analyzing module, said priority analyzing module determines a priority of the media file based on priority rules and at least two of the location media tag, the event media tag, and the content media tag;
- a facial recognition component of said content analyzing module for identifying at least one person in the media file; and
- a network component of said priority analyzing module for searching a network system of the user to determine whether the identified person is in the user's network, wherein said priority analyzing module determines the priority of the media file based on whether the identified person is in the user's network; and
- a storage management module connected to said priority analyzing module, said storage management module stores the media file in said digital camera based on the priority determined by said priority analyzing module.

11. The system according to claim 10, further including:
- a first storage device connected to said priority analyzing module for storing at least one higher priority media file, said first storage device having a first data retrieval time for retrieving the higher priority media file; and
- a second storage device connected to said priority analyzing module for storing at least one lower priority media file, said second storage device having a second data retrieval time for retrieving the lower priority media file, wherein the first data retrieval time is faster than the second data retrieval time.

12. The system according to claim 10, further including an interface connected to said priority analyzing module, said interface receives input from a user of said digital camera for setting the priority rules, the input including at least two of:
   at least one higher priority location media tag;
   at least one lower priority location media tag;
   at least one higher priority event media tag;
   at least one lower priority event media tag;
   at least one higher priority content media tag;
   at least one lower priority content media tag;
   at least one media file flagged by the user; and
   at least one media file rated by the user.

13. The system according to claim 10, further including:
   a calendar component of said content analyzing module for identifying an upcoming event on a calendar of the user;
   an event component of said priority analyzing module for determining whether the media file has an event tag related to the upcoming event; and
   wherein said priority analyzing module assigns a higher priority to the media file if the media file has the event tag related to the upcoming event.

14. The system according to claim 10, further including an emotion component of said content analyzing module for analyzing at least one media file on said digital camera to identify at least one of smiles, frowns, laughter, and crying, wherein said priority analyzing module determines the priority of the media file based on said analyzing.

15. A system for managing media files on a digital camera, said system including:
   a content analyzing module for tagging at least one media file on said digital camera with at least one event media tag indicative of an event where the media file was created;
   a priority analyzing module connected to the content analyzing module, said priority analyzing module determines a priority of the media file based on priority rules and the event media tag; and
   a storage management module connected to said priority analyzing module, said storage management module stores the media file in said digital camera based on the priority determined by said priority analyzing module.

16. The system according to claim 15, further including:
   a first storage device connected to said priority analyzing module for storing at least one higher priority media file, said first storage device having a first data retrieval time for retrieving the higher priority media file; and
   a second storage device connected to said priority analyzing module for storing at least one lower priority media file, said second storage device having a second data retrieval time for retrieving the lower priority media file, wherein the first data retrieval time is faster than the second data retrieval time.

17. The system according to claim 15, further including an interface connected to said priority analyzing module, said interface receives input from a user of said digital camera for setting the priority rules, the input including at least one of:
   at least one higher priority location media tag;
   at least one lower priority location media tag;
   at least one higher priority event media tag;
   at least one lower priority event media tag;
   at least one higher priority content media tag;
   at least one lower priority content media tag;
   at least one media file flagged by the user; and
   at least one media file rated by the user.

18. The system according to claim 15, further including:
   a facial recognition component of said content analyzing module for identifying at least one person in the media file; and
   a network component of said priority analyzing module for searching a network system of the user to determine whether the identified person is in the user's network,
   wherein said priority analyzing module determines the priority of the media file based on whether the identified person is in the user's network.

19. The system according to claim 15, further including:
   a calendar component of said content analyzing module for identifying an upcoming event on a calendar of the user;
   an event component of said priority analyzing module for determining whether the media file has an event tag related to the upcoming event; and
   wherein said priority analyzing module assigns a higher priority to the media file if the media file has the event tag related to the upcoming event.

20. The system according to claim 15, further including an emotion component of said content analyzing module for analyzing at least one media file on said digital camera to identify at least one of smiles, frowns, laughter, and crying, wherein said priority analyzing module determines the priority of the media file based on said analyzing.

21. A non-transitory computer program product for managing media files on a digital camera, said computer program product comprising:
   a non-transitory computer readable storage medium;
   first program instructions to tag at least one media file on the digital camera, the tagging including:
      tagging the media file with at least one location media tag indicative of the geographic location where the media file was created,
      tagging the media file with at least one event media tag indicative of an event where the media file was created, and
      tagging the media file with at least one content media tag indicative of an individual in the media file;
   second program instructions to determine a priority of the media file based on priority rules and at least one of the location media tag, the event media tag, and the content media tag;
   third program instructions to store the media file in the digital camera based on the determined priority; and
   fourth program instructions to, upon connection of the digital camera to an external storage device, automatically transfer at least one lower priority media file to the external storage device,
   wherein said first program instructions, said second program instructions, said third program instructions, and said fourth program instructions are stored on said computer readable storage medium.

22. The computer program product according to claim 21, wherein said third program instructions at least one of:
   stores a higher priority media file on a first storage device; and
   stores a lower priority media file on a second storage device,
   wherein data retrieval from the first storage device is faster than data retrieval from the second storage device.

23. The computer program product according to claim 21, further including fifth program instructions to set the priority rules based on input from a user of the digital camera, the input including at least one of:
   at least one higher priority location media tag;
   at least one lower priority location media tag;

at least one higher priority event media tag;
at least one lower priority event media tag;
at least one higher priority content media tag;
at least one lower priority content media tag;
at least one media file flagged by the user; and
at least one media file rated by the user.

* * * * *